United States Patent [19]

Vesterlund

[11] 4,364,781

[45] Dec. 21, 1982

[54] METHOD OF TREATING ZIRCONIUM-BASED ALLOY TUBES

[75] Inventor: Gunnar Vesterlund, Västeras, Sweden

[73] Assignee: AB Asea-Atom, Västeras, Sweden

[21] Appl. No.: 235,627

[22] Filed: Feb. 18, 1981

[30] Foreign Application Priority Data

Feb. 22, 1980 [SE] Sweden ............................ 8001401

[51] Int. Cl.³ ............................................. C23F 7/02
[52] U.S. Cl. ........................................ 148/6.3; 427/6; 427/231; 427/309; 427/405
[58] Field of Search ................... 427/5, 6, 309, 405, 427/239; 148/6.3; 204/32 R

[56] References Cited

U.S. PATENT DOCUMENTS 4,017,368  4/1977  Wax et al. ...................... 156/656
4,284,660  8/1981  Donaghy et al. ................ 427/239

FOREIGN PATENT DOCUMENTS 55-44574  3/1980  Japan ............................ 204/32 R

OTHER PUBLICATIONS

Schickner et al., J. of the Electrochemical Soc., vol. 100, Jun. 1953, pp. 289–291.

*Primary Examiner*—Ralph S. Kendall
*Attorney, Agent, or Firm*—Watson, Cole, Grindle & Watson

[57] ABSTRACT

In the process of applying a layer of copper and a layer of zirconium dioxide to the internal surface of a tube of a zirconium-based alloy, with the layer of zirconium dioxide being located between the copper layer and the internal surface of the tube, the tube surface is first treated with an activating solution in the form of an aqueous solution containing from about 1 to about 3 grams/liter of hydrogen fluoride, from about 2 to about 8 grams/liter of ammonium fluoride and from about 0.1 to about 0.5 gram/liter of sulfuric acid, the amounts of hydrogen fluoride and ammonium fluoride being chosen so that the amount of ammonium fluoride, calculated in moles, exceeds the amount of hydrogen fluoride, calculated in moles, by at least 5 percent.

14 Claims, 1 Drawing Figure

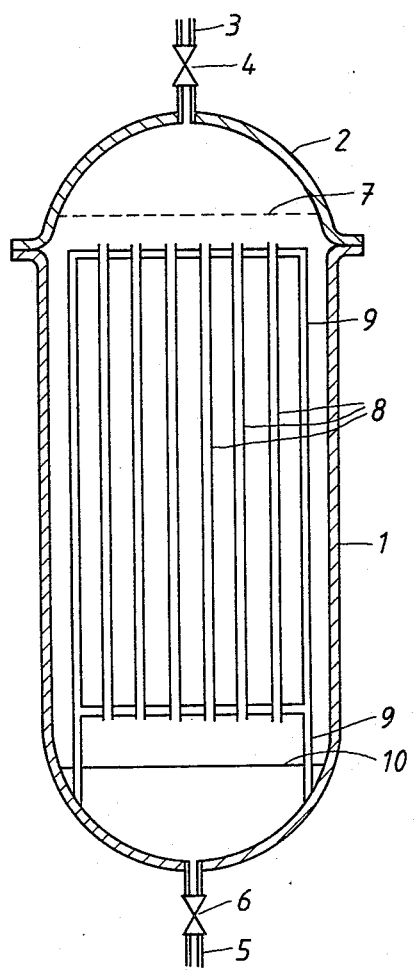

METHOD OF TREATING ZIRCONIUM-BASED ALLOY TUBES

TECHNICAL FIELD

This invention relates to a method of applying a layer of copper and a layer of zirconium dioxide to the internal surface of a tube made of a zirconium-based alloy.

BACKGROUND ART

Thin-walled tubes of a zirconium-based alloy, for example a zirconium-tin alloy, are normally used as cladding tubes for the fuel for nuclear reactors. Such tubes may be internally lined with a layer of copper to increase their resistance to stress corrosion induced by fission products. For neutron economy it is necessary for this copper lining layer to be thin. One problem in connection with such internally lined cladding tubes is that, during the operation of the nuclear reactor, copper from the lining layer diffuses into the cladding tube, so that after a time the copper lining layer loses its ability to protect the tube. One known method for preventing the diffusion of copper into a zirconium-based alloy tube is to arrange a layer of zirconium dioxide between the internal surface of the tube and the copper lining layer. The zirconium dioxide layer, which thus serves as a barrier against the diffusion of copper into the zirconium-based alloy, may be applied as a coating on the tube by oxidizing the tube before the copper lining layer is applied thereon. The zirconium dioxide layer may also be produced after the copper lining layer has been applied to the tube by bringing the tube with its copper lining layer, at elevated temperature, into contact with water vapor or some other substance which has the ability to oxidize zirconium but does not have the ability to oxidize copper.

It is known to activate the surface of a tube of a zirconium-based alloy by treating it with an activating solution before the tube is provided with a coating of copper or other metal, either electrolytically or by chemical precipitation. In this connection there has been used as the activating solution an aqueous solution containing from 10 to 20 grams per liter (g/l) of ammonium bifluoride and from 0.75 to 2 g/l of sulfuric acid or an aqueous solution containing 0.2 mole/liter (7.4 g/l) of ammonium fluoride and 0.13 mole/liter (2.6 g/l) of hydrogen fluoride, respectively.

The present invention aims to provide a method of applying a layer of copper and a layer of zirconium dioxide to the internal surface of a tube of a zirconium-based alloy, wherein a markedly improved adhesion of the copper layer to the base material is achieved.

DISCLOSURE OF THE INVENTION

According to the present invention a method of applying a layer of copper and a layer of zirconium dioxide on the internal surface of a tube of a zirconium-based alloy with the layer of zirconium dioxide between the copper layer and the tube, comprises the step, prior to the application of the copper and zirconium dioxide layers, of treating the internal surface of the tube with an activating solution in the form of an aqueous solution containing from about 1 to about 3 g/l of hydrogen fluoride, from about 2 to about 8 g/l of ammonium fluoride and from about 0.1 to about 0.5 g/l of sulfuric acid, the amounts of hydrogen fluoride and ammonium fluoride in the activating solution being chosen so that the amount of ammonium fluoride, calculated in moles, exceeds the amount of hydrogen fluoride, calculated in moles, by at least 5 percent, a proportion of the above-specified amount of ammonium fluoride and at least a proportion of the above-specified amount of hydrogen fluoride being optionally provided in the form of ammonium bifluoride.

In a particularly preferred embodiment of the method according to the invention, the activating solution contains from about 1 to about 2 g/l of HF, from about 3 to about 4 g/l of $NH_4F$ and from about 0.2 to about 0.3 g/l of $H_2SO_4$.

The zirconium-based alloy from which the tube is made preferably consists of a zirconium-tin alloy, for example the zirconium-based alloys known under the trade name "Zircaloy 2" and "Zircaloy 4," which contain from 1.2 to 1.7 percent by weight of Sn, from 0.07 to 0.24 percent by weight of Fe, from 0.05 to 0.15 percent by weight of Cr, from 0.0 to 0.08 percent by weight of Ni, and from 0.09 to 0.16 percent by weight of 0, the remainder being zirconium and impurities, if any, of ordinary kind.

The reason for the markedly improved adhesion of the copper layer is probably the structure of the internal surface of the tube that is achieved when treating the tube with the activating solution. Contrary to the case when using the previously known activating solutions, with which an even homogeneous surface is obtained, the treatment with the activating solution in the method according to the present invention brings about a pitting of the internal surface of the tube. The pits may have a depth of from about 0.01 to about 5 microns and a mutual distance which is less than about 50 microns. The pitting results in a large efficient surface.

The surface of a tube of zirconium-based alloy normally has a thin oxide layer. During the treatment of the internal surface of the tube with the activating solution when employing the method according to the invention, the oxide is first corroded away pointwise. The pointwise area where the corrosion has started is then extended around the point of attack, whereby the above-mentioned pits are formed. In the attacked areas, the metallic material is exposed. Preferably, the treatment with the activating solution is continued until the metallic material is exposed over at least half of the surface treated with the activating solution. The time of treatment is suitably from about one minute to a few minutes.

In a preferred embodiment of the method according to the invention the tube of the zirconium-based alloy is subjected to an oxidation step before being treated with the activating solution. The oxidation step has proved to give an increased reproducibility when manufacturing tubes having a predetermined, desired adhesion of the copper layer. The oxidation may be performed using various oxidizing agents, for example, by heating in air or oxygen gas to a temperature of from about 200° to about 300° C. for a period of from about 15 to about 90 minutes, or by immersing the tube in an amount 45 percent solution of sodium hydroxide, which has been heated to about 90° C., for about 30 minutes. The oxidation step results in the formation of an oxide layer on the surface of the tube which preferably has a thickness of from about 0.01 to about 0.1 micron. The tube thus oxidized is treated with the activating solution. Again, the time of treatment with the activating solution is suitably from about one minute to a few minutes. Through the treatment with the activating solution, the previously described pitting is obtained, preferably involving exposure of the metallic material over at least half of the surface treated with the activating solution.

After the treatment with the activating solution, the copper layer is applied to the internal surface of the tube and a zirconium dioxide layer is applied between the internal surface of the tube and the copper layer. In a preferred embodiment, a copper layer having a thickness of from about 1 to about 25 microns is applied electrolytically to the internal surface of the tube, after which the tube with the copper layer is brought into contact with steam or some other substance which has the ability to oxidize zirconium but does not have the ability to oxidize copper, preferably at a temperature of from about 200° to about 550° C., until a layer of zirconium dioxide having a thickness of from about 0.01 to about 10 microns has been formed between the copper layer and the tube of zirconium-based alloy. Preferably, the tube is then subjected to a heat treatment at a temperature of from about 300° to about 800° C. in vacuum or in an atmosphere inert to zirconium and copper, for example, an argon or helium atmosphere.

BRIEF DESCRIPTION OF THE FIGURE

The invention will now be described, by way of example, with reference to the accompanying FIGURE, which is a schematic sectional view of an autoclave used in performing the method according to the invention.

DESCRIPTION OF PREFERRED EMBODIMENTS

A tube of "Zircaloy 2" for cladding fuel for a light water reactor is oxidized in air at a temperature of 250° C. for 30 minutes, at the end of which time there is an oxide layer on the tube having a thickness of approximately 0.02 micron. After washing the tube with water, it is treated for 2.5 minutes with an activating solution in the form of an aqueous solution containing 3.7 g/l of $NH_4F$, 1.3 g/l of HF and 0.26 g/l of $H_2SO_4$. The tube is then provided with an internal coating of copper. For this purpose, the tube may be connected to the negative pole of a d.c. source, whereas an anode of, for example, copper centrally arranged in the tube is then connected to the positive pole of the d.c. source. Electrolyte, which may consist of a sulfuric acid/copper sulphate solution having a pH value of 0.5, is supplied to the space between the tube and the anode, possibly while the tube and the anode are moved relative to one another. The electrolysis may take place using a current density of approximately 0.3 $A/cm^2$. Several tubes treated in this manner, in which the copper layer has a thickness of 5 microns, are treated in the autoclave 1 shown in the FIGURE, in which the treated tubes are designated by the numeral 8.

The autoclave 1 has a cover 2, and it may be provided with a heating device arranged in its wall, for example heating coils, or it may be heated from the outside with, for example, hot air. The autoclave 1 is provided at its top with a conduit 3 containing an openable and closable valve 4 and at its bottom with another conduit 5 containing an openable and closable valve 6. The autoclave 1 is first filled with water to the level shown by the dashed line 7, and the water is boiled at atmospheric pressure for about half an hour while the valve 4 is held open. During this time, the water is degassed and escaping gases, for example oxygen, leave the autoclave 1 via the conduit 3. The cover 2 is then removed and the tubes 8, provided with an internal coating of copper as described above, are placed in a rack 9 in the autoclave 1, after which the cover 2 is applied again. The rack 9 is of such a construction that the interiors of the tubes 8 are in open communication with the environment inside the autoclave. After a further period of boiling the water in the autoclave, so as to remove any air introduced in connection with the insertion of the tubes, the valve 4 is shut and the valve 6 is opened, causing the main part of the water to pass out from the autoclave through the conduit 5 until the water is at the level 10 shown by the unbroken line. The valve 6 is then shut. The autoclave 1 is then heated so that the tubes are surrounded with superheated steam at a temperature of 425° C. and a pressure of from 1 to 5 bar. After treatment for five hours at this temperature, a barrier layer of zirconium dioxide having a thickness of about 0.5 micron is obtained between the copper layer and the internal surface of each of the tube 8, and after treatment for twenty-four hours the thickness of the zirconium dioxide layers is about 1 micron. Thereafter, the tubes are heat-treated at a temperature of 550° C. for three hours in an argon atmosphere in a separate furnace.

In the above-described example, the barrier layer may be produced with substances other than steam which have the ability to oxidize zirconium but do not have the ability to oxidize copper, for example, water, carbon dioxide, carbon monoxide, sulfur dioxide and certain metal oxides such as oxides of iron, nickel, molybdenum and copper. It is possible to add hydrogen to the substance that produces the barrier layer, preferably in an amount of 0.01 ppm to 50 ppm. In the described case, the copper layer may be alternatively applied by conventional precipitation employing chemical methods.

The method according to the invention may also be employed in the case where the zirconium dioxide layer is produced on the inner surface of the tube before the copper layer is applied. For the formation of such a layer, the tube may be treated in the same way as has been described above with reference to the tube with an already-applied copper layer, such as, for example, with steam at a temperature of 425° C. for a period of 24 hours. In this case, the copper layer is applied by conventional chemical precipitation, for example, from an aqueous solution containing copper sulfate, sodium potassium tartrate, sodium hydroxide and formaldehyde.

What is claimed is:

1. A method of producing cladding tubes, said method comprising the steps of
   (a) providing a tube made of a zirconium-based alloy,
   (b) treating the internal surface of the tube of step (a) to form an oxide layer thereon having a thickness of between about 0.01 and about 0.1 micron,
   (c) contacting the oxide layer on the internal surface of the tube of step (b) with an activating solution, said activating solution consisting of an aqueous solution containing from about 1 to about 3 g/l of hydrogen fluoride, from about 2 to about 8 g/l of ammonium fluoride and from about 0.1 to about 0.5 g/l of sulfuric acid, the amount of ammonium fluoride, calculated in moles, exceeding the amount of hydrogen fluoride, calculated in moles, by at least 5 percent,
   (d) applying a copper layer to the treated oxide layer on the internal surface of the tube of step (c), and (e) treating the tube of step (d) to provide a layer of zirconium dioxide between the internal surface of the tube and the copper layer thereon.

2. The method as defined in claim 1 wherein step (c) is conducted for a sufficiently long time that at least half of the oxide layer on the internal surface of the tube of step (b) is removed.

3. The method as defined in claim 1 wherein in step (b) the oxide layer is formed on the internal surface of the tube of step (a) by heating the tube in air to a temperature of about 200° C. to about 300° C. for between about 15 and about 90 minutes.

4. The method as defined in claim 1 wherein in step (b) the oxide layer is formed on the internal surface of the tube of step (a) by heating the tube in oxygen to a temperature of about 200° C. to about 300° C. for between about 15 and about 90 minutes.

5. The method as defined in claim 1 wherein in step (b) the oxide layer is formed on the internal surface of the tube of step (a) by immersing the tube in an amount 45 percent solution of sodium hydroxide, which has been heated to about 90° C., for about 30 minutes.

6. The method as defined in claim 1 wherein in step (e) the zirconium dioxide layer is formed between the internal surface of the tube and the copper layer thereon by contacting the tube of step (d) with steam at a temperature of between about 200° C. and about 550° C.

7. The method as defined in claim 1 wherein a proportion of the ammonium fluoride and a proportion of the hydrogen fluoride in the activating solution used in step (c) are provided as ammonium bifluoride.

8. A method of producing cladding tubes, said method comprising the steps of
(a) providing a tube made of a zirconium-based alloy,
(b) treating the internal surface of the tube of step (a) to form an oxide layer thereon having a thickness of between about 0.01 and about 0.1 micron,
(c) contacting the oxide layer on the internal surface of the tube of step (b) with an activating solution, said activating solution consisting of an aqueous solution containing from about 1 to about 3 g/l of hydrogen fluoride, from about 2 to about 8/gl of ammonium fluoride and from about 0.1 to about 0.5 g/l of sulfuric acid, the amount of ammonium fluoride, calculated in moles, exceeding the amount of hydrogen fluoride, calculated in moles, by at least 5 percent,
(d) applying a layer of zirconium dioxide to the treated oxide layer on the internal surface of the tube of step (c), and
(e) treating the tube of step (d) to provide a layer of copper on the layer of zirconium dioxide.

9. The method as defined in claim 8 wherein step (c) is conducted for a sufficiently long time that at least half of the oxide layer on the internal surface of the tube of step (b) is removed.

10. The method as defined in claim 8 wherein in step (b) the oxide layer is formed on the internal surface of the tube of step (a) by heating the tube in air to a temperature of about 200° C. to about 300° C. for between about 15 and about 90 minutes.

11. The method as defined in claim 8 wherein in step (b) the oxide layer is formed on the internal surface of the tube of step (a) by heating the tube in oxygen to a temperature of about 200° C. to about 300° C. for between about 15 and about 90 minutes.

12. The method as defined in claim 8 wherein in step (b) the oxide layer is formed on the internal surface of the tube of step (a) by immersing the tube in an about 45 percent solution of sodium hydroxide, which has been heated to about 90° C., for about 30 minutes.

13. The method as defined in claim 8 wherein in step (d) the zirconium dioxide layer is formed by contacting the tube of step (c) with steam at a temperature of between about 200° C. and about 550° C.

14. The method as defined in claim 8 wherein in step (e) the copper layer is formed on the layer of zirconium dioxide by chemically precipitating the copper thereon from an aqueous solution containing copper sulfate, sodium potassium tartrate, sodium hydroxide and formaldehyde.

* * * * *